June 24, 1924.
F. A. WHEELER ET AL
SIGNALING DEVICE FOR AUTOMOBILES
Filed Feb. 15, 1921   2 Sheets-Sheet 2
1,499,274
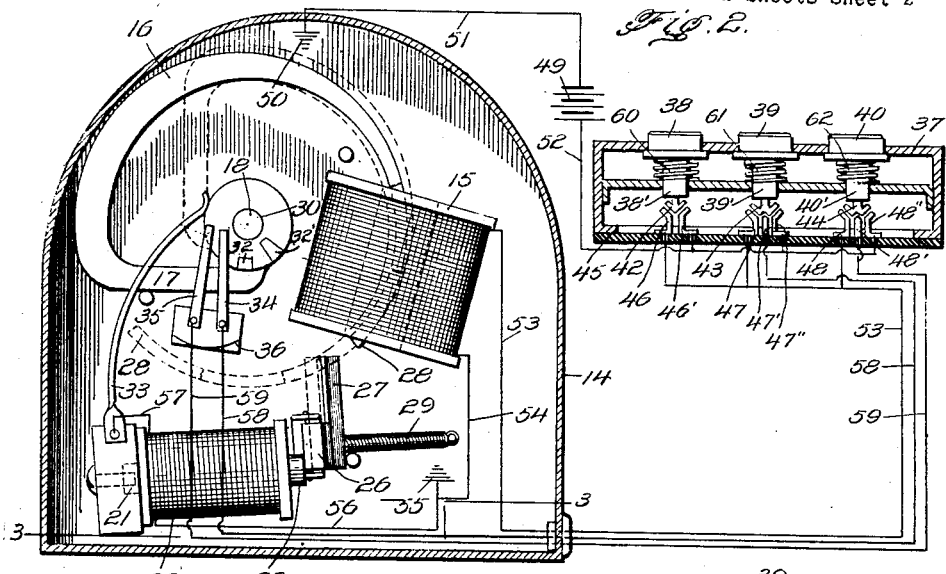
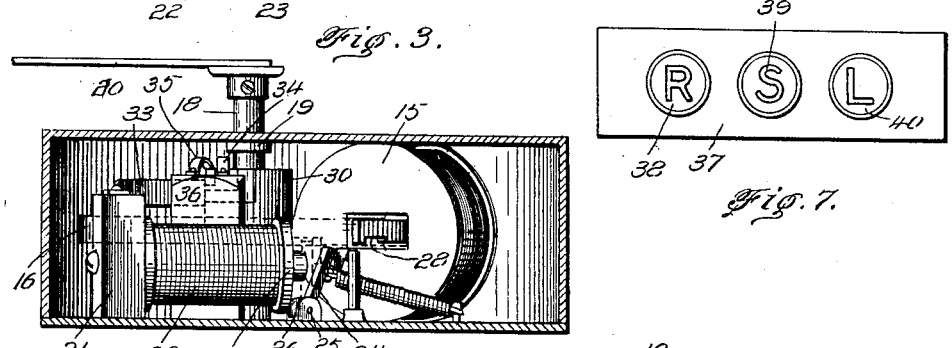
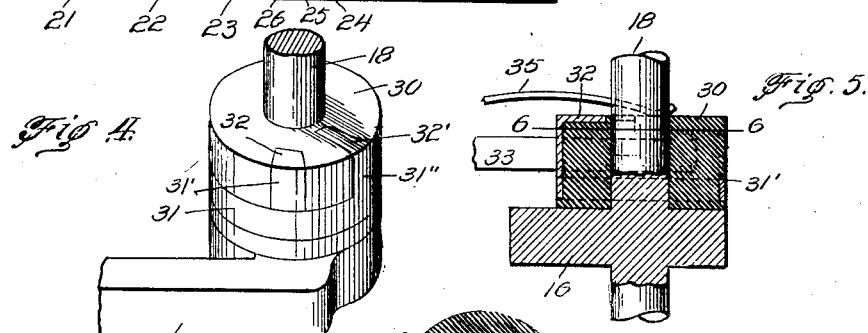
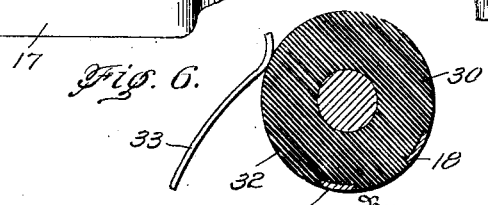
Inventor
F. A. Wheeler and
H. T. Phelps.

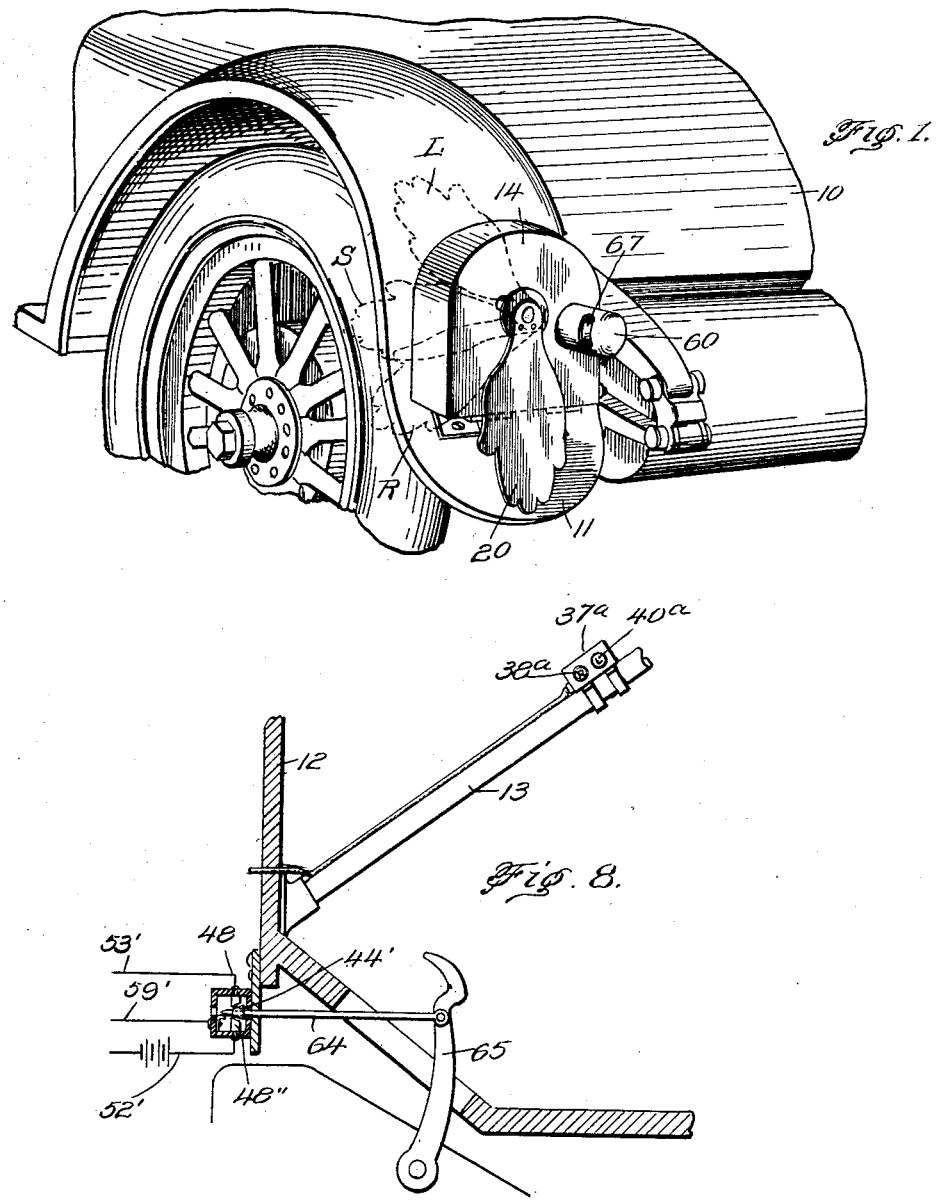

Patented June 24, 1924.

1,499,274

UNITED STATES PATENT OFFICE.

FRANK A. WHEELER AND HARRY T. PHELPS, OF FLINT, MICHIGAN.

SIGNALING DEVICE FOR AUTOMOBILES.

Application filed February 15, 1921. Serial No. 445,271.

*To all whom it may concern:*

Be it known that we, FRANK A. WHEELER and HARRY T. PHELPS, citizens of the United States, residing at Flint, in the county of Genesee and State of Michigan, have invented certain new and useful Improvements in Signaling Devices for Automobiles, of which the following is a specification.

The invention relates to an improvement in signaling devices for vehicles generally, and more particularly to a semaphore type of such devices adapted for use on automobiles for indicating contemplated directional movements thereof.

The principal object of the invention is to provide for a signal device of the class described, and one adapted to be carried at the rear of a vehicle, preferably on the rear curved face of one of the mud guards at the left side thereof in full and prominent view of the operators of following vehicles, and embodying a movable signal arm adapted to be actuated in a manner to give indications of proposed turning movements of the vehicle on which the signal is carried, in lieu of the usual and various inefficient signals now given by the operator by projecting his hand outward from the side of the vehicle.

Another object of the invention is to provide a signaling device of the character specified, and one which is electrically actuated and controlled from a point immediately adjacent the driver's or operator's seat in the vehicle.

A further object of the invention is to provide a signaling device with a means whereby the signal arm will be moved to "stop" indicating position simultaneously with the application of the brake mechanism of the vehicle or automobile, in addition to a manually actuated switching means for causing the same to move to such indicating position.

A still further object of the invention is to provide a signaling device of a construction adapting the same for use in various other positions on a vehicle other than on the rear portion of the mud guard thereof, as aforesaid, and which is capable for use on any and all known types or makes of vehicles and automobiles.

With the foregoing and other objects in view, the invention resides in the certain new and useful features of construction and arrangement of parts, as will be hereinafter more fully described, set forth in the appended claims, and illustrated in the accompanying drawings, in which:—

Fig. 1 is a fragmentary view, in perspective, of the rear portion of an automobile showing the preferred arrangement of the signaling device thereon, Fig. 2 is a vertical sectional view through the signal housing and showing the control switching mechanism connected in circuit with the signal operating devices, Fig. 3 is a sectional view of the device taken on the line 3—3 of Fig. 2, Fig. 4 is an enlarged detail of the switching device controlling the magnetic locking device, Fig. 5 is a vertical sectional detail of the switching device as shown in Fig. 4, Fig. 6 is a sectional view taken on the line 6—6 of Fig. 5, Fig. 7 is a top plan view of the controlling switch, showing the arrangement of the actuating buttons thereon, and, Fig. 8 is a sectional detail of the dash portion of an automobile, showing a modified form of the switching device associated with the brake pedal, whereby the signal is to be actuated to "stop" position upon manipulation of the latter.

Referring to the drawings, 10 indicates the rear portion of an automobile, 11 the rear left mud guard thereof, 12 the dash portion of the same, and 13 the steering column disposed immediately in the rear of the dash and the driver's or operator's position therein.

The signaling device is preferably secured in position on the rear of the curved face of the mud guard 11, as shown in Fig. 1, although it is capable of being as readily positioned at any other suitable point on the body of the vehicle, and the same consists of a housing portion 14 of sheet metal or the like, capable of being entirely closed in a manner to prevent access thereto of moisture under any and all weather conditions, the upper surface of the same being curved whereby to facilitate the shedding of moisture therefrom. The housing 14 is preferably provided with a suitable connection (not shown) whereby it may be supported in position on the vehicle by means of any of the usual forms of supporting brackets now in common use for positioning spotlights on the same.

Located within the housing 14 is a solenoidal magnet 15 having its bore disposed in suitable angular position to operably receive therein a curved arm core 16 which acts as the operating lever for moving the signal arm 20 to its various indicative positions, the arm or core 16 having an inwardly and angularly bent portion 17, which is secured at its free end to a shaft or spindle 18, which is journaled in the outer wall of the casing, as at 19, and has the signal arm 20 secured on its free outwardly projecting end portion, the signal arm normally depending therefrom medially of the housing.

Secured to a horizontally disposed bracket or lug 21, and projecting inwardly from one of the side walls of the housing, is a holding magnet 22, which has its longitudinal axis inclined slightly out of parallel relation with respect to the bottom wall of the latter, and has one end of its iron core 23 projecting outwardly of its free end and directly in front of an armature 24, which is pivoted, as at 25, in a pair of spaced ears or lugs 26 projecting inwardly of the side wall of the housing. The upper end of the armature is formed to provide a latch portion 27 which, when operative, is disposed in the path of the free arm 16, and adapted for engagement with recesses formed in the latter, whereby to hold the signal arm in any of its three operative positions as indicated in dotted lines on Fig. 1, the first position (R) indicating "right turn"; the second position (S) indicating "stop"; and the third position (L) indicating "left turn." The armature 24 is normally tensioned away from the core end 23 by means of a coiled spring 29, so that the latch member or portion 27 is tilted out of the path of the core arm 16 whereby to permit the latter to have free movement to the desired signaling position of the signal arm 20.

Mounted on the shaft 18 within the housing is a cylindrical body 30, formed of a suitable insulating material, which has embedded in its periphery a facial conductor strip 31 extending laterally from which in spaced parallel relation are a pair of facial contact strips or segments 31' and 31", the strip 31" being of a slightly greater length than the strip 31'. The free ends of these strips 31' and 31" are bent over the edge of the body 30 to provide radially disposed contacts designated 32 and 32', respectively for convenience, the contact 32' being of greater length than the contact 32. A spring contact arm 33 is secured to and insulated from the bracket or lug 21 and is arranged to bear on the periphery of the cylinder 30 and to make contact with the contact strips 31' and 32", when the latter is rotated. Arranged to bear against the side of the cylinder 30 for independent contact with the contact portions 32 and 32', are a pair of contact arms 34 and 35, which are secured to a block 36, of an insulating material which, in turn, is secured to one side wall of the housing 14.

A control switch mechanism is provided, and the same is preferably in the form of a substantially rectangular housing 37, adapted to be secured at a convenient point on the steering column 13 of the automobile, as shown in Fig. 8. This switch mechanism is preferably made up of three button switches, 38, 39 and 40, correspondingly designated R (right turn); S (stop); and L (left turn), each opening through the top face of the housing 37, and having shank portions 38', 39' and 40' projecting inwardly of the partition walls 41, which extend lengthwise of the housing, the inner end of the shank 38' being provided with substantially V-shaped contact shoe 42, and the shanks 39' and 40' with substantially W-shaped contacts or contact shoes 43 and 44, respectively. Enclosing the bottom wall of the housing 37 is a plate 45, of an insulating material, on which is mounted the contact associated with the switch buttons 38, 39, and 40, whereby to open and close the several control circuits leading from the battery to a charge-supplying circuit and connecting the magnet devices within the signal housing 14. Associated with the contact 42 is a pair of spaced contacts 46 and 46'; with the contact 43 a set of contacts 47, 47' and 47"; and with the contact 44, a set of contacts 48, 48', and 48".

A battery, or other source of current supply, 49 is provided, and the same has one of its terminals grounded, as at 50, to the housing 14 of the signal device, by means of a conductor 51, and its other terminal connected by conductor 52 to the contacts 46', 47" and 48", of the button switches 38, 39, and 40, respectively. The contacts 46, 47 and 48, of the button switches 38, 39 and 40 are commonly connected by means of a conductor 53 to one terminal of the solenoid magnet 15, which has its other terminal connected by means of a conductor 54 to a ground 55 on the housing 14, and to a conductor 56 leading to one terminal of the latch operating magnet, 22, the remaining terminal of the latter being, in turn, connected by a conductor 57 to the contact arm 33. The contact 47' of the switch button 39 is connected by a conductor 58 to the contact arm 34, while the contact 48' of the button switch 40 is connected by the conductor 59 to the contact arm 35.

In the operation of the device thus provided, when it is desired to set the signal arm 20 to show a right turning movement of the car or vehicle on which this device is carried, button 38 is pressed, and current will flow from battery 49, conductor 52, contact 46', button contact 42, contact 46, conductor 53, magnet 15, conductor 54, to ground 55, through housing 14 to ground 50, and by conductor 51 back to battery, thus operating main magnet 15 only, which draws the free curved end of the core arm 16 inward of the bore thereof to the first position of the signal arm 20, as indicated at (R) in Fig. 1. When a stop is to be made, the button 39 is pressed and the current will flow from battery 49, through conductor 52, contact 47", switch contact 43, contact 47', conductor 58, contact arm 34, contact 32, contact arm 33, conductor 57, locking magnet 22, conductor 56 to ground 55, also by contact 47 through conductor 53 to magnet 15, and by conductor 54 to ground 55 through housing 14 to ground 50 and to battery 49 through conductor 51. With current passing through magnet 15, in this instance, the core arm 16 will be drawn inward of the bore thereof, for the swinging of the signal arm to "stop" indicating position, as at large (S) in Fig. 1, at the end of which swinging movement the cylinder 30 will have been rotated sufficiently to bring contact 32 under contact arm 34 so that the holding magnet 22 is energized and attracts its armature 26 thereby bringing the latch end of the latter into engagement with the core arm 16 for holding the same in proper position. When a left turn is to be indicated the button 40 is pressed, and current will flow from battery 49, by conductor 52 to contact 48", switch contact 44, contact 48', conductor 59, contact arm 35, contact 32', contact strip 32, contact arm 33, conductor 57, magnet 22, conductor 56 to ground 55, also by contact 48, conductor 53 to magnet 15, conductor 54 to ground 55 and through the housing 14 to ground 50 and by conductor 51 back to battery 49. Upon the energizing of the magnet 15, in this instance, the core arm 16 is drawn inward of the bore thereof, and the signal arm 20 is moved to "Left turn" indicating position designated at (L) in Fig. 1. During the movement of the arm 20 the cylinder 30 is rotated so that the contact 32' is positioned under the contact arm 35, so that the locking magnet 22 is energized at the proper time to attract the armature 26, for the swinging of the latch part thereof against the core arm, whereby to hold the same and, consequently, the signal arm 20 is properly positioned. Upon the release of the buttons 38, 39, and 40, after manipulation as in the instances recited for the same, the circuits are restored to normal open position, the buttons being returned to normally raised position by means of coiled springs 60, 61 and 62, respectively, and upon the opening of the circuits, the signal arm 20 is returned to normal position as shown in Fig. 1, swinging downwardly by gravity for such purpose, during which swinging movement, the core arm 16 is returned to its normally inoperative position.

In Fig. 8 there is shown a slightly modified arrangement of the invention, and in this instance, a switching device 63 is directly connected by a rod 64 to the brake pedal 65 of the automobile, so that whenever the brakes are applied for the slowing down or stopping of the latter, the signal arm 20 will always be simultaneously moved to "Stop" indicating position. The switching device 63 may be used in lieu of the stop switch button 39, in which case, the button switch device 37ª is to be made only with the buttons 38ª and 40ª, with the leads or conductors of the device 63 connected in the circuits therewith after the manner as is hereinbefore described for the button switch 39.

It is contemplated to provide the signal housing 14 with an outwardly extending cylindrical lamp casing 66, the same preferably entirely closing a lamp for protection, and having a slotted opening 67 whereby to direct a beam of light across the path of the signal arm 20 for fully illuminating the latter in all of its operative positions.

Having thus fully described the invention, what is claimed, is:—

1. An electrically operated automobile signaling device comprising a housing, a shaft supported thereby and projecting outwardly therefrom, a signal arm carried on the outer end of the arm, a solenoid magnet arranged within said housing, a curved core arm secured at one end to the inner end of said shaft and shiftable by said magnet for actuating said shaft, selective control means for effecting the operation of said magnet thereby actuating said core to shift the shaft to move said signal arm to any one of its several indicative positions, a holding magnet within said housing and provided with a spring controlled armature engaging, when said holding magnet is energized, in said core for holding the latter in its shifted position, circuit forming means extended from said holding magnet and supporting a plurality of contacts and further including a contact member cooperating with any one of said plurality of contacts to close the holding magnet circuit, and a switching device secured to and bodily movable with said shaft and having means cooperating with said member and said contacts for controlling said holding magnet circuit correspondingly with the movement of said core arm.

2. An electrically operated automobile signaling device comprising a signal arm carrying shaft provided with a switching device bodily movable therewith, a solenoid magnet, a core arm secured to said shaft and shiftable by said magnet for actuating said shaft to position the signal arm carried thereby, selective control means for effecting the operation of said magnet thereby shifting said core arm and actuating said shaft, a holding magnet provided with a spring controlled armature engaging in said core, when the holding magnet is energized, for retaining the core in its shifted position, and circuit forming means extended from said holding magnet and including a plurality of contacts and a contact member cooperating with any one of said plurality of contacts to close the holding magnet circuit, and said switching device bodily shiftable with said shaft cooperative with said member and contacts for controlling the holding magnet circuit correspondingly with the movement of said shaft.

In testimony whereof, we affix our signatures hereto.

FRANK A. WHEELER,
HARRY T. PHELPS.